(12) United States Patent
Winkler

(10) Patent No.: US 7,605,332 B2
(45) Date of Patent: Oct. 20, 2009

(54) APPARATUS FOR MEASURING AND WEIGHING FISH

(76) Inventor: John Winkler, 417 W. Weiland Ave., Appleton, WI (US) 54911

( * ) Notice: Subject to any disclaimer, the term of this patent is extended or adjusted under 35 U.S.C. 154(b) by 0 days.

(21) Appl. No.: 12/045,812

(22) Filed: Mar. 11, 2008

(65) Prior Publication Data

US 2009/0229168 A1 Sep. 17, 2009

(51) Int. Cl.
*G01G 19/08* (2006.01)
(52) U.S. Cl. .................... 177/25.13; 177/136; 177/238; 177/245; 707/102; 114/343; 114/78; 43/4; 340/573.2; 33/511
(58) Field of Classification Search .................. 114/78, 114/343; 707/102; 340/573.2; 33/832, 511; 177/25.13, 131, 136, 148, 149, 245, 238, 177/262; 43/4
See application file for complete search history.

(56) References Cited

U.S. PATENT DOCUMENTS

| | | | | |
|---|---|---|---|---|
| 2,688,878 A | * | 9/1954 | Kolisch | 73/865 |
| 2,727,391 A | * | 12/1955 | Kolisch | 73/865 |
| 2,750,184 A | * | 6/1956 | Warndahl | 177/127 |
| 4,660,666 A | * | 4/1987 | Reder et al. | 177/148 |
| 4,696,360 A | * | 9/1987 | Homen | 177/262 |
| 4,753,031 A | * | 6/1988 | Owen | 43/54.1 |
| 5,637,838 A | * | 6/1997 | Arey et al. | 177/148 |
| 6,222,449 B1 | * | 4/2001 | Twining | 340/539.11 |
| 6,415,733 B1 | * | 7/2002 | Hudson et al. | 114/343 |
| 6,594,939 B2 | * | 7/2003 | Ondusko | 43/4 |
| 6,608,261 B2 | * | 8/2003 | Thadani | 177/126 |
| 6,765,155 B1 | * | 7/2004 | Gray | 177/148 |
| 7,173,197 B1 | * | 2/2007 | Kasperek | 177/131 |
| 7,264,291 B2 | * | 9/2007 | Radu et al. | 296/24.34 |
| 7,408,125 B2 | * | 8/2008 | Lentine | 177/148 |
| 2002/0166705 A1 | * | 11/2002 | Swayze | 177/253 |
| 2003/0155787 A1 | * | 8/2003 | Lein et al. | 296/24.1 |
| 2005/0161543 A1 | * | 7/2005 | Stiner et al. | 242/223 |

FOREIGN PATENT DOCUMENTS

FR 2601771 A1 * 1/1988 ................. 177/264

* cited by examiner

*Primary Examiner*—Randy W Gibson
(74) *Attorney, Agent, or Firm*—Boyle Fredrickson, S.C.

(57) ABSTRACT

A fish weighing device configured to be integral with the lid of a compartment in a fishing craft. The device includes a fishing rod locker lid configured to provide access to a fishing rod locker in a fishing boat, a fish holding compartment configured to receive a fish, the fish holding compartment being integrated into the lid of the fishing rod locker, and a fish weight measurement device configured to measure the weight of a fish placed within the fish holding compartment.

20 Claims, 3 Drawing Sheets

APPARATUS FOR MEASURING AND WEIGHING FISH

BACKGROUND

The present application relates generally to an apparatus for measuring and weighing fish. More particularly, the present application is a fish weighing and measuring device configured to be integrated into a fishing rod locker.

Sports fishermen often utilize fish measuring devices to determine the characteristics of the fish they catch. The measured characteristics can include a fish weight and a fish length. This information can be used by the fishermen to keep logs of their daily, weekly, monthly, and/or seasonal catch, to determine compliance with local regulations, to measure their success in comparison with other fishermen, for example in a fishing tournament setting, etc.

Traditional fish measuring devices generally include a tape measure and a handheld fish weight measuring device. These devices are typically separate handheld devices although some devices combine the functions in a single device. These devices are often carried by the fishermen in their tackle box, stored in a fishing boat toolbox or other compartment, etc.

These traditional measuring devices are susceptible to the problems typical of portable devices. For example, a handheld fish scale may easily be left behind by the fishermen, lost among the clutter of a tackle box, knocked overboard into the water, etc. Further, calibration of the weighing device may easily be compromised as the portable device is knocked around in a tackle box, fishermen's pocket, etc.

What is needed is a fish measuring device configured to be integrated in the body of a fishing craft. What is further needed is such device configured to implement a weighing function and/or a measuring function. What is yet further needed is such a device configured to implement a plurality of advanced functions such as record-keeping, wireless communication, additional input tracking, etc.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One embodiment of the invention relates to a fish weighing device configured to be integral with the lid of a compartment in a fishing craft. The device includes a fishing rod locker lid configured to provide access to a fishing rod locker in a fishing boat, a fish holding compartment configured to receive a fish, the fish holding compartment being integrated into the lid of the fishing rod locker, and a fish weight measurement device configured to measure the weight of a fish placed within the fish holding compartment.

Another embodiment of the invention relates to a fish weighing device. The device includes a storage compartment in a watercraft having a storage compartment lid, a fish holding compartment configured to receive a fish, the fish holding compartment being integrated into the storage compartment lid, and a fish weight measurement device configured to measure the weight of a fish placed within the fish holding compartment.

Yet another embodiment of the invention relates to an integrated fish characteristic measurement device. The device includes a storage compartment inset into the deck of a watercraft, the storage compartment including a compartment lid that is substantially flush to the deck of the watercraft and a fish characteristic measurement device integrated into the compartment lid. The fish characteristic measurement device includes a fish holding compartment extending downward from the compartment lid into the storage compartment, a measurement device lid configured to cover the fish holding compartment and be substantially flush with the compartment lid when in a closed position, and a fish weight measuring device configured to provide an indicia of the weight of a fish when the fish is placed within the fish holding compartment. The integrated fish characteristic measurement device further includes an electronic interface configured to receive an electronic signal from the fish characteristic measurement device, the electronic signal including at least one characteristic for a fish placed within the fish holding compartment.

Alternative examples and other exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Figure 1:
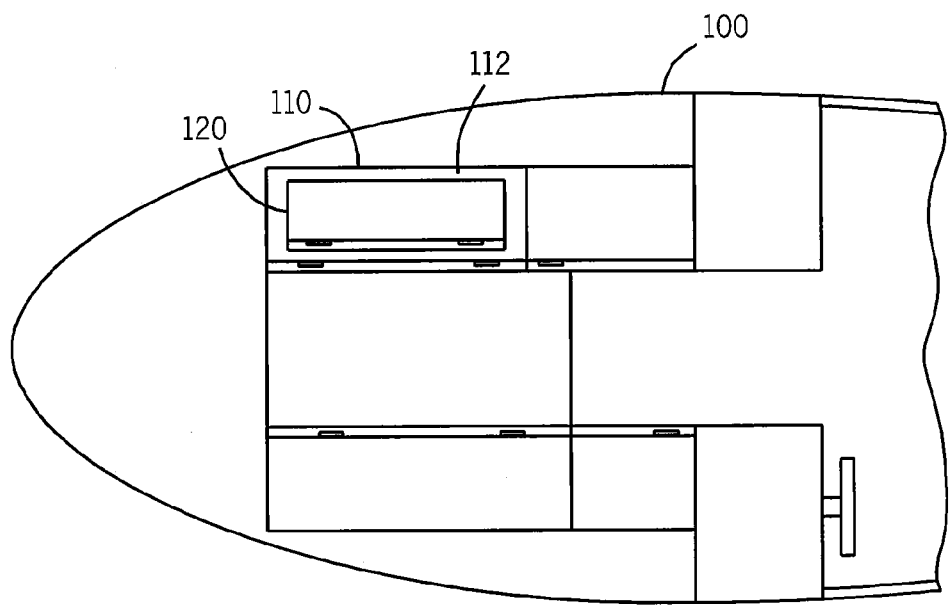
FIG. 1 is a top-down view of a fishing boat including a fishing rod locker that includes an integrated fish weighing and measuring device, according to an exemplary embodiment.

Before describing in detail the particular improved system and method, it should be observed that the invention includes, but is not limited to, a novel structural combination of elements, and not in particular detailed configurations thereof. Accordingly, the structure, methods, functions, control, and arrangement of conventional components have, for the most part, been illustrated in the drawings by readily understandable representations, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring to FIG. 1, a top-down view of a fishing boat 100 including a fishing rod locker 110 that includes an integrated fish weighing and measuring device 120 is shown, according to an exemplary embodiment. Although fishing boat 100, fishing rod locker 110, and integrated fish weighing and measuring device 120 are shown as having particular configurations and being positioned in particular locations it should be understood by one of ordinary skill in the art, that integrated fish weighing and measuring device 120 may have a variety of configurations and can be positioned at a variety of locations in fishing boat 100 to implement the functionality described herein. Further, although fish weighing and measuring device 120 is shown and described herein as integrated into the lid of fishing rod locker 110, one of ordinary skill in the art would understand that the device may be packaged as a component of the fishing boat 100 and/or as an after-market add-on to be integrated into the rod locker 110.

Fishing boat 100 may be any type of vehicle having a compartment with an integral lid into which weighing and measuring device 120 may be integrated. According to an exemplary embodiment, fishing boat 100 may be a dedicated fishing boat. Dedicated fishing boats may include any of a plurality of features amenable to sports fishing, such as storage lockers, integrated fishing rod locker 110, an integrated live well, a driver's console, etc. built into the deck of the fishing boat 100.

Rod storage locker 110 may be a compartment extending into the whole of the fishing boat 100 having a locker lid 112 including the integral weighing and measuring device 120, further described below with reference to FIGS. 2A-C. Storage locker 110 and locker lid 112 may be configured such that locker lid 112 is flush with the deck of fishing boat 100. Storage locker 110 may further be configured such that a fisherman may move around the deck of fishing boat 100 and even stand on the locker lid 112 and measuring and weighing device 120.

Integrated fish weighing and measuring device 120 may be a fish weighing and length measurement device configured to be integrated into the locker lid 112 of storage locker 110, described below in further detail with reference to FIGS. 2A-C. Although weighing and measuring device 120 is described herein as being incorporated into the locker lid 112 storage locker 110, it should be understood by one of ordinary skill in the art that fish weighing and measuring device 120 may alternatively be incorporated into alternative locations or compartments within fishing boat 100. For example, fish weighing and measuring device 120 may be incorporated into the lid of a live well integrated into fishing boat 100.

Figure 2C:
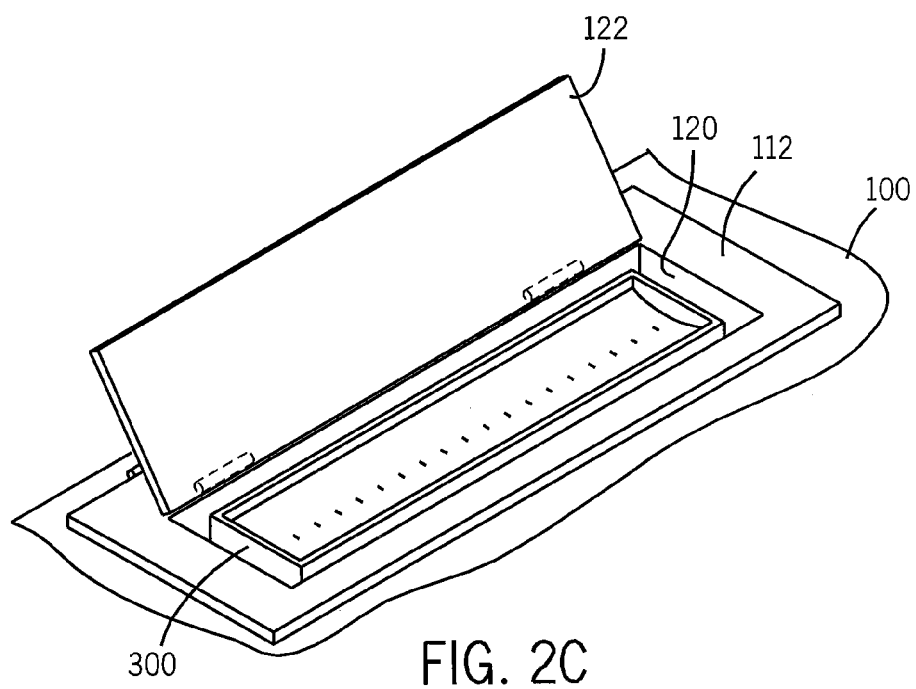
FIG. 2C is a perspective view of the fish weighing and measuring device incorporated into the fish locker lid and including a device lid configured to provide a flush surface with the fishing rod locker lid when closed, according to exemplary embodiment.
Figure 2A:
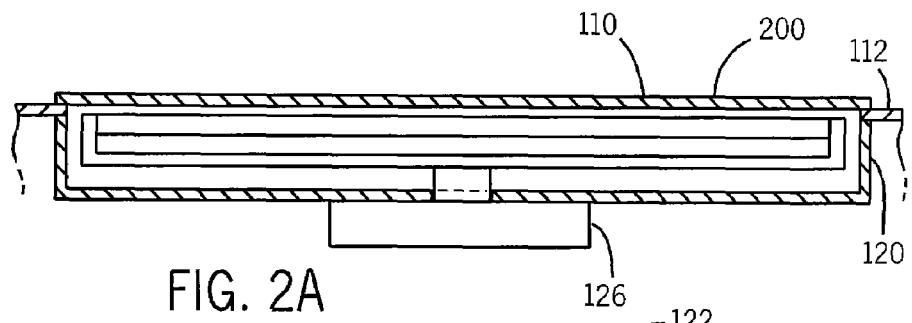
FIG. 2A is a longitudinal view of the fishing rod locker of FIG. 1 including a fish weighing and measuring device integrated into the lid, according to an exemplary embodiment.

Referring now to FIG. 2A, a longitudinal view 200 of fishing rod locker 110 including fish weighing and measuring device 120 integrated into lid 112 is shown, according to an exemplary embodiment. Weighing and measuring device 120 may be a rectangular box extending downwardly into fishing rod locker 110 from lid 112. Weighing and measuring device 120 includes an integrated weighing scale 126 and an integrated length measurement scale 124.

Weighing scale 126 may be any type of scale configured to receive and determine the weight of an object placed thereupon, such as, but not limited to, a spring scale, a hydraulic scale, a pneumatic scale, a balance, etc. Weighing scale 122 may be configured to provide output as a digital and/or analog weight measurement.

Figure 2B:
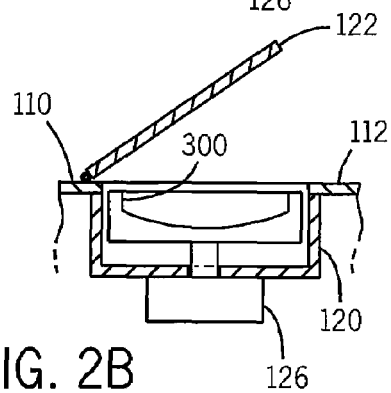
FIG. 2B is a transverse view of the fishing rod locker including the fish weighing and measuring device integrated into the lid of the fishing rod locker including a weighing scale tray and having a device lid, according to an exemplary embodiment.

Referring now to FIG. 2B, a transverse view 200 of fishing rod locker 110 including fish weighing and measuring device 120 integrated into lid 112 including a weighing scale tray 300 and having a device lid 122 is shown, according to an exemplary embodiment.

The weighing scale of device 120 may be incorporated into the body of device 120. For example, a fish place within the compartment defined by device 120 may measurably downwardly displace the compartment into fishing rod locker 110. According to an alternative embodiment, a scale may be placed into device 120 to rest on a bottommost portion of the compartment defined by device 120.

Referring now to FIG. 2C, a perspective view of device 120 incorporated into lid 112 and including a device lid 122 configured to provide a flush surface with lid 112 when in a closed position is shown, according to exemplary embodiment. Advantageously, device 120 including device lid 122 is configured to be flush with lid 112 which is in turn flush with the deck of fishing boat 100 such that the user may easily walk over and/or stand on top of fishing rod locker 110 and device 120 as needed while fishing.

Figure 3A:
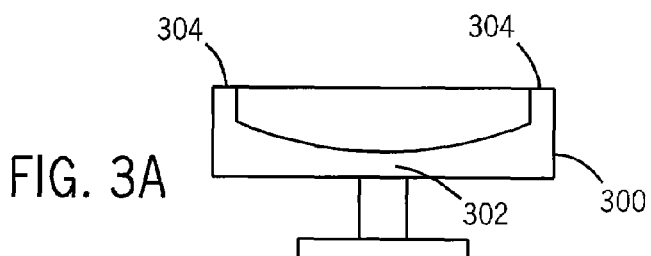
FIG. 3A is a weighing scale that may include a weighing scale tray configured to extend lengthwise along the length of a bottommost portion of the weighing and measuring device, according to an exemplary embodiment.

Referring now to FIG. 3A, a weighing scale 126 may include a weighing scale tray 300 configured to extend lengthwise along the length of a bottommost portion of weighing and measuring device 120 is shown, according to an exemplary embodiment. Weighing scale tray 300 may include a convex floor portion 302 and two laterally extending edges 304 extending upward from the bottom of device 120 toward lid 112. The convex floor portion 302 and laterally extending edges 304 are configured to receive the fish to be weighed and measured.

According to an exemplary embodiment, weighing scale tray 300 may be implemented as a removable tray to be placed within weighing and measuring device 120. Weighing and measuring device 120 may be calibrated to account for the weight of weighing scale tray 300 in providing a weight measurement. Weighing scale tray 300 may be easily removed from weighing and measuring device 120 for cleaning. According to an alternative embodiment, device 120 may be implemented without weighing scale tray 120 or such that weighing scale tray 300 is integral to device 120.

Accordingly to an exemplary embodiment, weighing scale 126 may be configured to include a local display (not shown). The local display may be used to display a weight, length or other value for a fish being placed within device 120. Weighing scale 126 may further include additional input and/or output, such as a "log catch" button allow a fisherman to indicate that a catch should be logged into a catch tracking system, described in further detail below with reference to FIGS. 4A-4C.

Figure 3B:
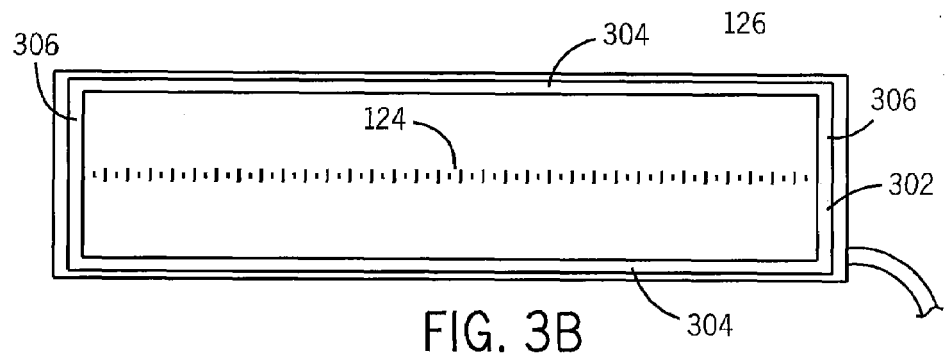
FIG. 3B is an integrated length measurement scale integrated into a convex floor portion of the fish weighing and measuring device, according to an exemplary embodiment.

Referring now to FIG. 3B, an integrated length measurement scale 124 integrated into convex floor portion 302 is shown, according to an exemplary embodiment. According to an alternative embodiment, integrated length measurement scale 124 maybe integrated into one or more of laterally extending edges 304.

According to yet another alternative embodiment, integrated length measurement scale 124 may include a length measurement arm (not shown) that is slideable along the length of length measurement scale 124 and configured to facilitate electronic recording of a length measurement, as described below with reference to FIG. 4A. A fishermen utilizing device 120 may position the tail of a fish at the beginning of integrated length measurement scale 124 and position the length measurement arm at the nose of the fish. Device 120 may be configured to electronically recognize the distance between the beginning of length measurement scale 124 and the length measurement arm to generate a digital measurement of the length of the fish placed within device 120.

Weighing scale tray 300 may be configured to include laterally extending end edges 306. Lateral extending edges 304 and lateral extending end edges 306 may be configured to contain a fish placed therein. Advantageously, edges 304 and 306 will contain water and other contaminants when a fish is placed therein. Weighing scale tray 300 and/or weighing and measuring device 120 may be configured to include a tie or other hold down mechanism to prevent movement of the fish during length and weight measurement.

Figure 4A:
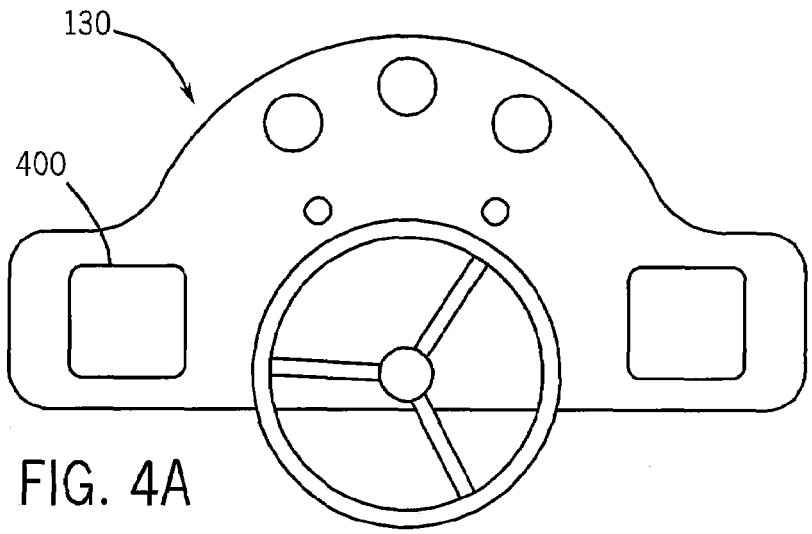
FIG. 4A is a fishing boat console including an electronic interface to the fish measuring and weighing device of FIG. 2A, according to an exemplary embodiment.

Referring now to FIG. 4A, a fishing boat console 130 including an electronic interface 400 to fish measuring and weighing device 120 is shown, according to exemplary embodiment. Fishing boat console 130 is configured to provide a central location from which a fisherman may operate fishing boat 100. In addition to electronic interface 400, console 130 may include a plurality of controls and informational displays configured to provide information to the operator of fishing boat 100. For example console 130 may include a fish locator display configured to provide a digital display providing information generated by a fish sonar device located on fishing boat 100.

Electronic interface 400 may be configured to display information generated by weighing and measuring device 120. Electronic interface 400 may further be configured to see one or more inputs from the user to control the operation of the electronic interface 400 and/or device 120 has further discussed below with reference to FIGS. 4B and 4C. Electronic interface 400 may be coupled to device 120 using a wired or wireless connection.

Electronic interface 400 may be configured to utilize touch screen technology to receive input from a user. Accordingly, electronic interface 400 may be configured to display information fields and a plurality of input fields, where user selection of an input field affects the operation of electronic interface 400 and/or operation of fish weighing and measuring device 120. Electronic interface 400 may further be coupled to one or more additional devices, such as, but not limited to, a GPS device, a communication system, etc. Information from the one or more additional devices may also be displayed and inputs provided using interface 400.

Figure 4B:
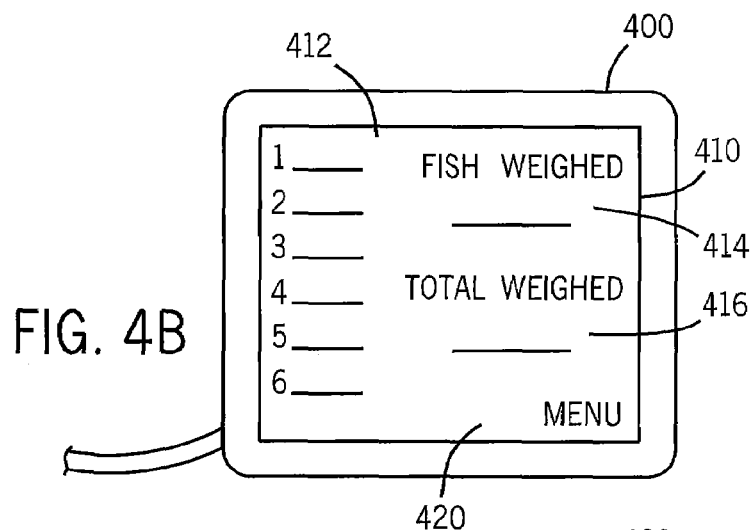
FIG. 4B is a fish measurement display screen shown by the electronic interface of FIG. 4A displaying the weight of a fish being weighed as well as the weight of five additional fish caught during that day, according to an exemplary embodiment.

Referring now to FIG. 4B, a fish measurement display screen 410 shown by electronic interface 400 displaying the weight of a fish being weighed as well as the weight of five additional fish caught during that day is shown, according to an exemplary embodiment. Display screen 410 includes a listing 412 of fish measurement weights, a total number of fish weighed indicator 414, a total fish weight indicator 416, and a menu button 420. Display screen 410 may further be configured to provide any of a variety of information values such as total number of fish caught, types of fish caught as entered by a user, etc.

Figure 4C:
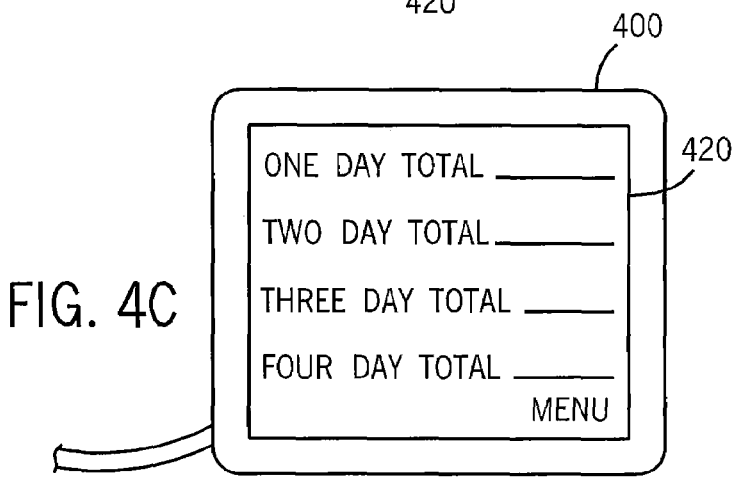
FIG. 4C is a fish measurement display screen shown by the electronic interface of FIG. 4A displaying the total weight of fish caught over a number of days, according to an exemplary embodiment.

In operation, electronic interface 400 may be utilized for fishing tournament information management. For example, in a fishing tournament, a fisherman generally tracks a total weight associated with a given number of fish caught by the fishermen (6 fish in the example shown). Electronic interface 400 further configured to allow the fishermen to selectively remove one or more fish listing 412 of fish measurement weights, for example where a user wishes to replace a smaller fish in listing 412 with a larger fish currently being weighed (Colin). Referring now to FIG. 4C, electronic interface 400 may further be configured to keep track of total weight of fish over a given number of days (e.g., the number of days in the tournament) on a total weight display screen 420.

Electronic interface 400 may further be coupled to a communication system (not shown), to facilitate information tracking by tournament directors during the course of the tournament. For example, were electronic interface 400 receives a new fish weight changing the total weight of fish associated with the particular fisherman, electronic interface 400 may be configured to transmit a wireless signal to the tournament directors indicating the updated total weight. This information transmission allows tournament directors to track and display to spectators the progress of the tournament's participants.

Electronic interface 400 may further be coupled one or more auxiliary data input devices. Exemplary devices may include but are not limited to, a GPS receiver, temperature gauge, a depth gauge, a barometer, a clock, a calendar, etc. Electronic interface 400 may further be configured to record a "snapshot" from all available data input devices when a fish measurement is received from device 120. Accordingly, a fisherman may automatically obtain a complete record of the location, time of day, weather, etc. when a particular fish was caught.

Electronic interface 400 may further be configured to include a data output device, such as a USB port allowing a user to attach a zip drive, a flash memory port, etc. advantageously, data obtained using device 120 and electronic interface 400 may be downloaded using the data output device and transferred to a personal computing system allowing a user to track and analyze large amount of information associated with their sport fishing. For example, a user may track successful fishing locations, successful fishing weather, personal fishing totals, etc.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of scale, type of wireless communication, or location of the scale used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A fish weighing device, comprising:
   a fishing rod locker lid configured to enclose a fishing rod locker, the fishing rod locker lid and fishing rod locker defining an enclosed fishing rod locker compartment when the fishing rod locker lid is in a closed position, wherein the fishing rod locker lid is pivotably mounted to the fishing rod locker to provide access to the fishing rod locker compartment, the fishing rod locker compartment being integrally formed in a fishing boat;
   a fish holding compartment configured to receive a fish, the fish holding compartment being integrated into the fishing rod locker lid such that the fish holding compartment extends into the fishing rod locker compartment when the fishing rod locker lid is in the closed position and such that the fish holding compartment is removed from the fishing rod locker compartment when the fishing rod locker lid is in an open position; and a fish weight measurement device fixedly coupled to the fish holding compartment such that the fish weight measurement device will be within the fishing rod locker compartment when the fishing rod locker lid is in the closed position and the fish weight measurement device will be removed from the fishing rod locker compartment when the fishing rod locker lid is in the open position, the fish weight measurement device being configured to measure the weight of a fish placed within the fish holding compartment.

2. The device of claim 1, wherein the fish holding compartment further includes a length measurement mechanism.

3. The device of claim 2, wherein the length measurement mechanism is configured to generate an electronic signal including the length and weight of the fish placed in the compartment.

4. The device of claim 1, further including an electronic interface configured to display measurements generated using the fish weighing device.

5. The device of claim 4, wherein the electronic interface is further coupled to at least one of a depth gauge, a global positioning system, and a temperature gauge.

6. The device of claim 4, further including a communication system configured to transmit the measurements generated using the fish weighing device to a location external to the fishing boat.

7. The device of claim 4, wherein the electronic interface is configured to maintain and display a fishing log including a historical record of measurements generated using the fish weighing device.

8. The device of claim 4, further including an output device configured to allow a user to download information generated by the fish weighing device.

9. A fish weighing device, comprising:
a storage compartment in a watercraft having a storage compartment lid configured to enclose the storage compartment, the storage compartment lid and storage compartment defining an enclosed compartment when the storage compartment lid is in a closed position, wherein the storage compartment lid is pivotably mounted to the storage compartment to provide access to the enclosed compartment;
a fish holding compartment configured to receive a fish, the fish holding compartment being integrated into the storage compartment lid such that the fish holding compartment extends into the storage compartment when the storage compartment lid is in the closed position and such that the fish holding compartment is removed from the storage compartment when the storage compartment lid is in an open position; and
a fish weight measurement device fixedly coupled to the storage compartment such that the fish weight measurement device will be within the storage compartment when the storage compartment lid is in the closed position and the fish weight measurement device will be removed from the storage compartment when the storage compartment lid is in the open position, the fish weight measurement device being configured to measure the weight of a fish placed within the fish holding compartment.

10. The device of claim 9 wherein the fish holding compartment further includes a length measurement mechanism.

11. The device of claim 10, wherein the length measurement mechanism is configured to generate an electronic signal including the length of the fish placed in the compartment.

12. The device of claim 9, further including an electronic interface configured to display measurements generated using the fish weighing device.

13. The device of claim 12, wherein the electronic interface is further coupled to at least one of a depth gauge, a global positioning system, and a temperature gauge.

14. The device of claim 12, further including a communication system configured to transmit the measurements generated using the fish weighing device to a location external to the fishing boat.

15. The device of claim 12, wherein the electronic interface is configured to maintain and display a fishing log including a historical record of measurements generated using the fish weighing device.

16. The device of claim 12, further including an output device configured to allow a user to download information generated by the fish weighing device.

17. An integrated fish characteristic measurement device, comprising:
a storage compartment inset into the deck of a watercraft, the storage compartment including a compartment lid that is substantially flush to the deck of the watercraft;
a fish characteristic measurement device integrated into the compartment lid, including
a fish holding compartment extending downward from the compartment lid into the storage compartment,
a measurement device lid configured to cover the fish holding compartment and be substantially flush with the compartment lid when in a closed position, and
a fish weight measuring device configured to provide an indicia of the weight of a fish when the fish is placed within the fish holding compartment; and
an electronic interface configured to receive an electronic signal from the fish characteristic measurement device, the electronic signal including at least one characteristic for a fish placed within the fish holding compartment.

18. The device of claim 17, wherein the electronic interface is coupled to at least one of a depth gauge, a global positioning system, and a temperature gauge.

19. The device of claim 17, further including a communication system configured to transmit the electronic signal generated using the fish characteristic measurement device to a location external to the fishing boat.

20. The device of claim 12, wherein the electronic interface is configured to maintain and display a fishing log including a historical record of measurements generated using the fish weighing device.

* * * * *